(12) United States Patent
Takashima et al.

(10) Patent No.: US 11,939,640 B2
(45) Date of Patent: Mar. 26, 2024

(54) METHOD FOR PRODUCING HOT-ROLLED STEEL SHEET, METHOD FOR PRODUCING COLD-ROLLED FULL-HARD STEEL SHEET, AND METHOD FOR PRODUCING HEAT-TREATED SHEET

(71) Applicant: JFE Steel Corporation, Tokyo (JP)

(72) Inventors: Katsutoshi Takashima, Tokyo (JP); Yoshimasa Funakawa, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 548 days.

(21) Appl. No.: 17/178,518

(22) Filed: Feb. 18, 2021

(65) Prior Publication Data

US 2021/0180151 A1 Jun. 17, 2021

Related U.S. Application Data

(62) Division of application No. 16/086,426, filed as application No. PCT/JP2017/011076 on Mar. 21, 2017, now Pat. No. 10,961,600.

(30) Foreign Application Priority Data

Mar. 31, 2016 (JP) .................................. 2016-070740
Nov. 29, 2016 (JP) .................................. 2016-231185

(51) Int. Cl.
*C21D 9/46* (2006.01)
*B32B 15/01* (2006.01)
*B32B 15/04* (2006.01)
*B32B 15/18* (2006.01)
*C21D 6/00* (2006.01)
(Continued)

(52) U.S. Cl.
CPC ................ *C21D 9/46* (2013.01); *B32B 15/01* (2013.01); *B32B 15/012* (2013.01); *B32B 15/013* (2013.01); *B32B 15/04* (2013.01); *B32B 15/043* (2013.01); *B32B 15/18* (2013.01); *C21D 6/001* (2013.01); *C21D 6/002* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0247* (2013.01); *C21D 8/0263* (2013.01); *C21D 8/0268* (2013.01); *C21D 8/0273* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/0224* (2022.08); *C23C 2/024* (2022.08); *C23C 2/04* (2013.01); *C23C 2/06* (2013.01); *C23C 2/12* (2013.01); *C23C 2/28* (2013.01); *C23C 2/40* (2013.01); *C23C 28/021* (2013.01); *C23C 28/023* (2013.01); *C23C 28/025* (2013.01); *C23C 30/00* (2013.01); *C23C 30/005* (2013.01); *C21D 8/0236* (2013.01); *C21D 2211/001* (2013.01); *C21D 2211/002* (2013.01); *C21D 2211/005* (2013.01); *C21D 2211/008* (2013.01); *C21D 2211/009* (2013.01); *C23G 1/00* (2013.01); *C23G 1/08* (2013.01); *Y10T 428/12757* (2015.01); *Y10T 428/12799* (2015.01);
(Continued)

(58) Field of Classification Search
CPC ................ B21B 3/02; B21B 2001/225; B21B 2015/0057; B21B 45/0218; C21D 8/0226; C21D 8/0273; C21D 9/46
See application file for complete search history.

(56) References Cited

U.S. PATENT DOCUMENTS

2013/0087254 A1* 4/2013 Funakawa ............... C22C 38/08
148/330
2014/0234655 A1 8/2014 Takashima et al.
(Continued)

FOREIGN PATENT DOCUMENTS

JP 2007092126 A 4/2007
JP 3936440 B2 6/2007
(Continued)

OTHER PUBLICATIONS

JP 2002-180190A, Okada et al. Jun. 2002.*
(Continued)

*Primary Examiner* — Edward T Tolan
(74) *Attorney, Agent, or Firm* — Buchanan Ingersoll & Rooney PC

(57) ABSTRACT

A method for producing a hot-rolled steel sheet, a method for producing a cold-rolled full-hard steel sheet, and a method for producing a heat-treated sheet are provided herein. The methods comprising hot rolling a steel material of a composition comprising, in mass %, C: 0.05 to 0.12%, Si: 0.80% or less, Mn: 1.30 to 2.10%, P: 0.001 to 0.050%, S: 0.005% or less, Al: 0.01 to 0.10%, N: 0.010% or less, one or more selected from Cr in an amount of 0.05 to 0.50%, and Mo in an amount of 0.05 to 0.50%, one or more selected from Ti in an amount of 0.01 to 0.10%, Nb in an amount of 0.01 to 0.10%, and V in an amount of 0.01 to 0.10%, and the balance Fe and unavoidable impurities.

10 Claims, No Drawings

| (51) | Int. Cl. | |
|---|---|---|
| | C21D 8/02 | (2006.01) |
| | C22C 38/00 | (2006.01) |
| | C22C 38/02 | (2006.01) |
| | C22C 38/04 | (2006.01) |
| | C22C 38/06 | (2006.01) |
| | C22C 38/08 | (2006.01) |
| | C22C 38/12 | (2006.01) |
| | C22C 38/14 | (2006.01) |
| | C22C 38/16 | (2006.01) |
| | C22C 38/18 | (2006.01) |
| | C22C 38/20 | (2006.01) |
| | C22C 38/22 | (2006.01) |
| | C22C 38/24 | (2006.01) |
| | C22C 38/26 | (2006.01) |
| | C22C 38/28 | (2006.01) |
| | C22C 38/32 | (2006.01) |
| | C22C 38/38 | (2006.01) |
| | C22C 38/40 | (2006.01) |
| | C22C 38/42 | (2006.01) |
| | C22C 38/44 | (2006.01) |
| | C22C 38/46 | (2006.01) |
| | C22C 38/48 | (2006.01) |
| | C22C 38/50 | (2006.01) |
| | C22C 38/54 | (2006.01) |
| | C22C 38/58 | (2006.01) |
| | C23C 2/02 | (2006.01) |
| | C23C 2/04 | (2006.01) |
| | C23C 2/06 | (2006.01) |
| | C23C 2/12 | (2006.01) |
| | C23C 2/28 | (2006.01) |
| | C23C 2/40 | (2006.01) |
| | C23C 28/02 | (2006.01) |
| | C23C 30/00 | (2006.01) |
| | C23G 1/00 | (2006.01) |
| | C23G 1/08 | (2006.01) |
| (52) | U.S. Cl. | |
| | CPC ............... Y10T 428/12951 (2015.01); Y10T 428/12958 (2015.01); Y10T 428/12972 (2015.01) | |

(56) References Cited

U.S. PATENT DOCUMENTS

| | | | |
|---|---|---|---|
| 2014/0342184 A1 | 11/2014 | Takagi et al. | |
| 2015/0017472 A1 | 1/2015 | Hideyuki et al. | |
| 2015/0240324 A1* | 8/2015 | Ehrhardt | C21D 6/008 |
| | | | 72/200 |
| 2015/0322552 A1 | 11/2015 | Takashima et al. | |
| 2015/0361530 A1* | 12/2015 | Imanaka | C21D 8/0236 |
| | | | 420/104 |
| 2016/0017465 A1* | 1/2016 | Toda | C22C 38/22 |
| | | | 420/83 |
| 2016/0032438 A1 | 2/2016 | Hirata et al. | |
| 2016/0151814 A1* | 6/2016 | Fischer | B21B 45/0218 |
| | | | 72/201 |
| 2016/0340755 A1 | 11/2016 | Han | |
| 2017/0159151 A1* | 6/2017 | Aoyama | B21B 1/28 |
| 2019/0078173 A1 | 3/2019 | Takashima et al. | |
| 2019/0085421 A1 | 3/2019 | Takashima et al. | |
| 2019/0085427 A1 | 3/2019 | Takashima et al. | |

FOREIGN PATENT DOCUMENTS

| | | |
|---|---|---|
| JP | 2008297609 A | 12/2008 |
| JP | 2014189812 A | 10/2014 |
| JP | 5699860 B2 | 4/2015 |
| JP | 2015078394 A | 4/2015 |
| WO | 2004104254 A1 | 12/2004 |
| WO | 2013099235 A1 | 7/2013 |
| WO | 2014097559 A1 | 6/2014 |

OTHER PUBLICATIONS

International Search Report and Written Opinion for International Application No. PCT/JP2017/011076, dated Jun. 27. 2017, 6 pages.
Non Final Office Action for U.S. Appl. No. 16/087,931, dated Jun. 16, 2020, 10 pages.
Entire patent prosecution history of U.S. Appl. No. 16/086,426, filed Sep. 19, 2018, entitled, "Steel Sheet and Plated Steel Sheet, Method for Producing Hot-Rolled Steel Sheet, Method for Producing Cold-Rolled Full-Hard Steel Sheet, Method for Producing Heat-Treated Sheet, Method for Producing Steel Sheet, and Method for Producing Plated Steel Sheet".

* cited by examiner

METHOD FOR PRODUCING HOT-ROLLED STEEL SHEET, METHOD FOR PRODUCING COLD-ROLLED FULL-HARD STEEL SHEET, AND METHOD FOR PRODUCING HEAT-TREATED SHEET

CROSS REFERENCE TO RELATED APPLICATIONS

This application is a divisional of U.S. patent application No. 16/086,426, filed Sep. 19, 2018, which is the U.S. National Phase application of PCT/JP2017/011076, filed Mar. 21, 2017, which claims priority to Japanese Patent Application No. 2016-070740, filed Mar. 31, 2016, and Japanese Patent Application No. 2016-231185, filed Nov. 29, 2016 the disclosures of each of these applications being incorporated herein by reference in their entireties for all purposes.

FIELD OF THE INVENTION

The present invention relates to a steel sheet and a plated steel sheet, and to a method for producing a hot-rolled steel sheet, a method for producing a cold-rolled full-hard steel sheet, a method for producing a heat-treated sheet, a method for producing a steel sheet, and a method for producing a plated steel sheet.

BACKGROUND OF THE INVENTION

Today's increasing environmental awareness has created stricter regulations on $CO_2$ emissions, and the automobile industry faces the challenge of making lighter vehicles for improved fuel consumption. To this end, high-strength steel sheets are used to make thinner automobile components, and steel sheets having a tensile strength (TS) of 590 MPa or more have been used for this purpose. High-strength steel sheets used for structural and reinforcing members of automobiles are galvanized to prevent rusting. Steel sheets are also required to satisfy desirable mechanical properties, including stretch flangeability (hole expansibility) and ductility. Particularly, a steel sheet used to form a component of a complex shape is required to satisfy both of these properties—elongation (ductility) and hole expansibility—at the same time, in addition to individually satisfying desirable elongation and hole expansibility. High-strength steel sheets used for structural and reinforcing members of automobiles are assembled into a module by spot welding after press working, and require high dimensional accuracy for assembling. High-strength steel sheets used for these applications are therefore required to be less susceptible to springback or other post-forming changes, and need to have a low yield ratio before working. Here, yield ratio (YR) is the ratio of yield stress (YS) to TS, and is represented by YR (%)=YS/TS×100(%). The strength of spot welded portions is also important from the standpoint of collision safety of automobiles, and, particularly, a sufficiently large cross tension strength (CTS) is needed.

A dual-phase steel (DP steel) of a ferrite-martensite structure is known as a low-yield-ratio high-strength steel sheet having both formability and high strength. A composite-structure steel containing martensite dispersed in the primary phase ferrite has a low yield ratio and a high TS, and the elongation is desirable. A drawback, however, is that a crack tends to occur when stress concentrates at the interface between ferrite and martensite, and the hole expansibility is poor.

PTL 1 discloses a high-strength steel sheet for automobiles in which the volume percentage and the average crystal grain diameter of ferrite and martensite with respect to the whole structure are controlled to satisfy collision safety and formability.

PTL 2 discloses a high-strength steel sheet in which fine ferrite having an average grain diameter of 3 μm or less, and martensite having an average grain diameter of 6 μm or less are controlled for their volume percentage with respect to the whole structure to improve elongation and stretch flangeability.

PTL 3 discloses a technique for improving spot weldability and workability, specifically, a hot-dip galvanized steel sheet containing 5 to 49% of bainite in the micro structure.

PATENT LITERATURE

PTL 1: Japanese Patent No. 3936440
PTL 2: JP-A-2008-297609
PTL 3: Japanese Patent No. 5699860

SUMMARY OF THE INVENTION

PTL 1 specifies the average crystal grain diameters for ferrite and martensite. However, the technique cannot provide the level of hole expansibility sufficient for stamping.

In PTL 2, the volume fraction of martensite is notably large, and the elongation is insufficient for the strength of the steel sheet.

The steel sheet of PTL 3 has a high YR, and is susceptible to springback or other post-forming changes.

It is difficult for a low-YR high-strength hot-dip galvanized steel sheet to exhibit the desired levels of elongation and hole expansibility necessary for stamping while providing CTS after spot welding. Indeed, at present, no steel sheet is available that satisfies all of these properties (yield ratio, strength (tensile strength), elongation, hole expansibility, and CTS). It is accordingly an object of the present invention to provide a plated steel sheet having these properties, and a method for producing such a plated steel sheet. The invention is also intended to provide a steel sheet needed to obtain the plated steel sheet, a method for producing a hot-rolled steel sheet needed to obtain the plated steel sheet, a method for producing a cold-rolled full-hard steel sheet needed to obtain the plated steel sheet, a method for producing a heat-treated sheet needed to obtain the plated steel sheet, and a method for producing a steel sheet needed to obtain the plated steel sheet.

The present inventors conducted intensive studies, and found that, in order to improve elongation, hole expansibility, and spot weldability (CTS) while maintaining a low yield ratio, it is important to control the volume fractions of different phases of a micro structure, and the average crystal grain diameters of specific phases. It was found that, by controlling these parameters, high hole expansibility can be achieved while maintaining a sufficiently high CTS after spot welding. The present invention is based on these findings.

The soft ferrite and the hard martensite need to be dispersed to achieve a low yield ratio. However, in a hole expansion test, when the hard martensite and retained austenite are present in the micro structure, voids occur at the interface, particularly, at the interface between the soft ferrite and these phases, at the time of punching. These voids join and propagate in the subsequent hole expansion process, and create cracks. When segregation due to manganese occurs in a steel sheet, the hard phase becomes plate-like in shape along the manganese segregation, and localized stress concentration occurs at the time of punching, increasing the number of voids. Elongation improves when a micro structure contains the soft ferrite and retained austenite. In a high-strength steel sheet, stress concentrates at end portions of a nugget after spot welding in a CTS test, and causes cracking. The crack propagates inside the nugget, and impairs breaking strength. The outcome is largely influenced by the toughness at the end portions of the nugget. Cracking becomes even more likely when inclusions such as MnS are present, and there is a need to reduce inclusions such as MnS, and segregation of phosphorus and sulfur at the end portions of a nugget.

After further studies, the present inventors found that, despite the presence of the hard martensite, strength and hole expansibility can be provided by adjusting the volume fractions of the void-causing soft and hard phases, and by making crystal grains finer. It was also found that this also makes fine crystal grains at the end portions of a nugget after spot welding, and improves toughness, and, accordingly, CTS.

As a rule, addition of manganese is necessary to provide a certain quantity of martensite. Manganese segregation in a steel sheet structure is reduced by controlling the Mn content to such an extent that segregation does not occur, and by controlling the heat treatment performed in hot rolling. At least one of other quenching elements Cr and Mo is added to provide a sufficient amount of martensite. By also adding at least one of V, Ti, and Nb in trace amounts for grain refining, it is possible to obtain a fine micro structure while maintaining sufficient quenchability for martensite generation. Reducing the Mn content reduces inclusions, and segregation of phosphorus and sulfur due to dropping of the solidification point at the end portions of a nugget. This has made it possible to improve spot weldability. Specifically, an embodiment of the present invention provides the following.

[1] A steel sheet of a composition comprising, in mass %, C: 0.05 to 0.12%, Si: 0.80% or less, Mn: 1.30 to 2.10%, P: 0.001 to 0.050%, S: 0.005% or less, Al: 0.01 to 0.10%, N: 0.010% or less, one or more selected from Cr: 0.05 to 0.50%, and Mo: 0.05 to 0.50%, one or more selected from Ti: 0.01 to 0.10%, Nb: 0.01 to 0.10%, and V: 0.01 to 0.10%, and the balance Fe and unavoidable impurities, and of a micro structure that contains 70 to 90% of ferrite, 5 to 20% of martensite, 5% or less of retained austenite, 10% or less of bainite, and 5% or less of perlite by volume, and in which the ferrite has an average crystal grain diameter of 20 μm or less, the martensite has an average crystal grain diameter of 5 μm or less, the retained austenite has an average crystal grain diameter of 5 μm or less, and the bainite has an average crystal grain diameter of 7 μm or less, the steel sheet having a tensile strength of 590 MPa or more.

[2] The steel sheet according to item [1], wherein the composition further comprises, in mass %, one or more selected from Cu: 0.50% or less, Ni: 0.50% or less, B: 0.01% or less, and a total of 0.005% or less of Ca and/or REM.

[3] A plated steel sheet comprising a plating layer on a surface of the steel sheet of item [1] or [2].

[4] The plated steel sheet according to item [3], wherein the plating layer is a hot-dip galvanized layer or a hot-dip galvannealed layer.

[5] A method for producing a hot-rolled steel sheet, the method comprising:

hot rolling a steel material of the composition of item [1] or [2] under the conditions where a rolling reduction of a final pass of finish rolling is 12% or more, a rolling reduction of a preceding pass of the final pass is 15% or more, and a finisher delivery temperature is 850 to 950° C.;

subjecting the steel after the hot rolling to first cooling in which the steel is cooled to a cooling stop temperature at a first average cooling rate of 50° C./s or more, the cooling stop temperature being 750° C. or less;

subjecting the steel after the first cooling to second cooling in which the steel is cooled to a coiling temperature at a second average cooling rate of 5° C./s or more and less than 50° C./s; and coiling the steel after the second cooling at a coiling temperature of 650° C. or less.

[6] A method for producing a cold-rolled full-hard steel sheet, the method comprising pickling and cold rolling the hot-rolled steel sheet obtained by the method of item [5].

[7] A method for producing a steel sheet, comprising:

heating the cold-rolled full-hard steel sheet obtained by the method of item [6], the cold-rolled full-hard steel sheet being heated under the conditions where the dew point in a temperature range of 600° C. or more is −40° C. or less, and a maximum achieving temperature is 730 to 880° C.;

retaining the heated cold-rolled full-hard steel sheet at the maximum achieving temperature for a retention time of 15 to 600 seconds; and cooling the retained cold-rolled full-hard steel sheet to a cooling stop temperature at an average cooling rate of 2 to 30° C./s, the cooling stop temperature being 650° C. or less.

[8] A method for producing a heat-treated sheet, comprising:

heating the cold-rolled full-hard steel sheet obtained by the method of item [6], the cold-rolled full-hard steel sheet being heated at a heating temperature of 700 to 900° C.; and cooling the cold-rolled full-hard steel sheet.

[9] A method for producing a steel sheet, comprising: heating the heat-treated sheet obtained by the method of item [8], the heat-treated sheet being heated under the conditions where the dew point in a temperature range of 600° C. or more is −40° C. or less, and a maximum achieving temperature is 730 to 880° C.;

retaining the heat-treated sheet at the maximum achieving temperature for a retention time of 15 to 600 seconds; and cooling the retained heat-treated sheet to a cooling stop temperature at an average cooling rate of 2 to 30° C./s, the cooling stop temperature being 650° C. or less.

[10] A method for producing a plated steel sheet, the method comprising plating a surface of the steel sheet obtained by the method of item [7] or [9].

[11] The method according to item [10], wherein the plating is a process that involves hot-dip galvanization, and alloying at 450 to 600° C.

A plated steel sheet provided by an embodiment of the present invention has a low yield ratio, and high tensile strength and high elongation, along with excellent hole expansibility and excellent spot weldability. By "low yield ratio", it means a yield ratio of 65% or less. By "high tensile strength", it means a tensile strength of 590 MPa or more. By "high elongation", it means an elongation of 28% or more. By "excellent hole expansibility", it means a hole expansion rate of 50% or more. By "excellent spot weldability", it means a CTS of 9.0 kN or more as measured for a 5.5-mm nugget after the spot welding of two laminated sheets each having a thickness of 1.2 mm. From the standpoint of obtaining a good balance between these effects, the tensile strength is preferably less than 780 MPa, more preferably 750 MPa or less.

The steel sheet, the method for producing a hot-rolled steel sheet, the method for producing a cold-rolled full-hard steel sheet, the method for producing a heat-treated sheet, and the method for producing a steel sheet of the present invention can be used as an intermediate product for obtaining the plated steel sheet of desirable properties above, or as methods for producing such an intermediate product, and contribute to improving the properties of a plated steel sheet.

DETAILED DESCRIPTION OF EMBODIMENTS OF THE INVENTION

An embodiment of the present invention is described below. The present invention, however, is not limited to the following embodiment.

The present invention represents a steel sheet and a plated steel sheet, and a method for producing a hot-rolled steel sheet, a method for producing a cold-rolled full-hard steel sheet, a method for producing a heat-treated sheet, a method for producing a steel sheet, and a method for producing a plated steel sheet. The following first describes how these are related to one another.

A steel sheet according to embodiments of the present invention is an intermediate product for obtaining a plated steel sheet of the present invention. In the case of a single method, a starting steel material such as a slab is formed into a plated steel sheet through a manufacturing process that produces a hot-rolled steel sheet, a cold-rolled full-hard steel sheet, and a steel sheet in succession. In the case of a double method, a starting steel material such as a slab is formed into a plated steel sheet through a manufacturing process that produces a hot-rolled steel sheet, a cold-rolled full-hard steel sheet, a heat-treated sheet, and a steel sheet in succession. The steel sheet according to embodiments of the present invention is a steel sheet produced in these processes.

The method for producing a hot-rolled steel sheet of the present invention is a method that produces the hot-rolled steel sheet in the foregoing process.

The method for producing a cold-rolled full-hard steel sheet of the present invention is a method that produces a cold-rolled full-hard steel sheet from the hot-rolled steel sheet in the foregoing process.

In the case of the double method, the method for producing a heat-treated sheet of the present invention is a method that produces a heat-treated sheet from the cold-rolled full-hard steel sheet in the foregoing process.

In the case of the single method, the method for producing a steel sheet of the present invention is a method that produces a steel sheet from the cold-rolled full-hard steel sheet in the foregoing process. In the case of the double method, the method for producing a steel sheet of the present invention is a method that produces a steel sheet from the heat-treated sheet in the foregoing process.

The method for producing a plated steel sheet of the present invention is a method that produces a plated steel sheet from the steel sheet in the foregoing process.

Because of these relationships, the hot-rolled steel sheet, the cold-rolled full-hard steel sheet, the heat-treated sheet, the steel sheet, and the plated steel sheet share the same composition, and the steel sheet and the plated steel sheet share the same micro structure. The following describes these common characteristics first, and the steel sheet, the plated steel sheet, and the producing methods will be described later.

Composition

The steel sheets according to embodiments of the present invention, including the plated steel sheet, have a composition containing, in mass %, C: 0.05 to 0.12%, Si: 0.80% or less, Mn: 1.30 to 2.10%, P: 0.001 to 0.050%, S: 0.005% or less, Al: 0.01 to 0.10%, N: 0.010% or less, one or more selected from Cr: 0.05 to 0.50%, and Mo: 0.05 to 0.50%, one or more selected from Ti: 0.01 to 0.10%, Nb: 0.01 to 0.10%, and V: 0.01 to 0.10%, and the balance Fe and unavoidable impurities.

The composition may further contain, in mass %, Cu: 0.50% or less, Ni: 0.50% or less, B: 0.01% or less, and a total of 0.005% or less of Ca and/or REM.

The components are described below. In the following, "%" representing the content of the component means percent by mass.

C: 0.05 to 0.12%

Carbon is an element that is effective at increasing the strength of the steel sheet. Carbon also contributes to forming a second phase, which is a phase other than ferrite (specifically, a second phase includes bainite, retained austenite, martensite, perlite, spherical cementite, and unrecrystallized ferrite), and increases the hardness of martensite. With a C content of less than 0.05%, it becomes difficult to provide the necessary volume fraction for martensite. The C content is preferably 0.06% or more, more preferably 0.07% or more. With an excess carbon content, the difference in the hardness of ferrite and martensite increases, and the hole expansibility deteriorates. An excess carbon content also impairs the toughness at end portions of a nugget after spot welding, and the CTS decreases. The C content is preferably 0.11% or less, more preferably 0.10% or less.

Si: 0.80% or Less

Silicon adds strength to ferrite through solid solution strengthening, and contributes to increasing the hole expansion rate by reducing the hardness difference between ferrite and the hard phase. However, silicon concentrates at the steel sheet surface in the form of an oxide during annealing, and impairs plateability. For this reason, the Si content is 0.80% or less. The Si content is preferably 0.60% or less, more preferably 0.48% or less, further preferably 0.45% or less, most preferably 0.40% or less. In view of hole expansion rate, the lower limit of Si content is preferably 0.05% or more, though it is not particularly limited.

Mn: 1.30 to 2.10%

Manganese is an element that contributes to increasing strength through solid solution strengthening and generation of the second phase. Manganese is also a component necessary for forming martensite, which lowers the yield ratio. Manganese needs to be contained in an amount of 1.30% or more to obtain this effect. When contained in excess, manganese impairs hole expansibility. An excess Mn content also promotes generation of inclusions such as MnS, and segregation of phosphorus and sulfur due to dropping of the solidification point at the end portions of a nugget at the time of spot welding. For this reason, the Mn content is 2.10% or less. The Mn content is preferably 2.05% or less, more preferably less than 2.00%.

P: 0.001 to 0.050%

Phosphorus contributes to enhancing strength through solid solution strengthening. By adjusting the P content, the alloying rate of the plating layer can be controlled to improve plateability. In order to obtain this effect, phosphorus needs to be contained in an amount of 0.001% or more. However, when contained in excess, phosphorus segregates at grain boundaries after spot welding, and the CTS decreases. For this reason, the P content is 0.050% or less, preferably 0.040% or less.

S: 0.005% or Less

With a high sulfur content, sulfur produces large amounts of sulfides such as MnS, and impairs spot weldability. MnS also becomes an initiation point of voids at the time of punching, and impairs hole expansibility. For this reason, the upper limit of S content is 0.005%, preferably 0.004% or less. The lower limit of S content is not particularly limited. However, an excessively small S content increases the steel production cost, and the S content is preferably 0.0003% or more.

Al: 0.01 to 0.10%

Aluminum is an element that is needed for deoxidation, and needs to be contained in an amount of 0.01% or more to obtain this effect. Aluminum also acts to reduce cementite precipitation during bainite transformation. With reduced cementite precipitation, the retained austenite occurs in excess, and the hole expansibility deteriorates. For this reason, the upper limit of Al content is 0.10%. The preferred Al content is 0.08% or less.

N: 0.010% or Less

Nitrogen needs to be contained in a reduced amount because this element forms a coarse nitride, and impairs the hole expansibility. The N content is 0.010% or less because this tendency becomes more pronounced with a N content of more than 0.010%. The N content is preferably 0.005% or less. In view of steel production cost, the lower limit of N content is preferably 0.0005% or more, though it is not particularly limited.

In the present invention, the composition of the steel sheets, including the plated steel sheet, may contain at least one of the following components, in addition to the components above.

Cr: 0.05 to 0.50%

Chromium is an element that contributes to lowering the yield ratio and enhancing strength by contributing to martensite generation. Chromium also greatly contributes to improving quenchability, which reduces Mn segregation. Chromium needs to be contained in an amount of 0.05% or more to exhibit this effect. The Cr content is preferably 0.10% or more. However, when contained in excess of 0.50%, chromium generates martensite in excess, and a chromium oxide occurs at the steel sheet surface during annealing. This impairs plateability, and often causes uneven plating. For this reason, the Cr content is 0.50% or less. The Cr content is preferably 0.40% or less, more preferably 0.35% or less.

Mo: 0.05 to 0.50%

As with the case of chromium, molybdenum can contribute to lowering the yield ratio and enhancing strength by improving quenchability and generating martensite. Molybdenum also contributes to enhancing strength by also generating carbides. In view of obtaining this effect, molybdenum needs to be contained in an amount of 0.05% or more. The Mo content is preferably 0.10% or more. However, when molybdenum is contained in excess of 0.50%, martensite occurs in excess, and the hole expansibility deteriorates. For this reason, the Mo content is 0.50% or less, preferably 0.40% or less, more preferably 0.30% or less. In the present invention, the composition of the steel sheets, including the plated steel sheet, may contain one or more of the following components, in addition to the components above.

Ti: 0.01 to 0.10%

Titanium forms a fine carbonitride, and acts to reduce nuclear growth during annealing. With this effect, titanium can contribute to making a fine micro structure, and further enhancing strength. In view of obtaining this effect, the lower limit of Ti content is 0.01%. The preferred lower limit of Ti content is 0.03%. However, adding titanium in large amounts seriously impairs elongation, and the yield strength overly increases as a result of precipitation strengthening. For this reason, the Ti content is 0.10% or less, preferably 0.07% or less.

Nb: 0.01 to 0.10%

As with the case of titanium, niobium forms a fine carbide, and can contribute to forming a fine steel sheet structure, and further enhancing strength. To obtain this effect, niobium is contained in an amount of 0.01% or more. The Nb content is preferably 0.03% or more. However, adding niobium in large amounts seriously impairs elongation, and the yield strength overly increases as a result of precipitation strengthening. For this reason, the Nb content is 0.10% or less. The Nb content is preferably 0.07% or less.

V: 0.01 to 0.10%

As with the case of titanium, vanadium forms a fine carbide, and can contribute to forming a fine micro structure, and further enhancing strength. To obtain this effect, vanadium is contained in an amount of 0.01% or more. The vanadium content is preferably 0.03% or more. However, adding vanadium in large amounts seriously impairs elongation, and the yield strength overly increases as a result of precipitation strengthening. For this reason, the V content is 0.10% or less. The V content is preferably 0.07% or less.

In the present invention, the composition of the steel sheets, including the plated steel sheet, may contain at least one of the following components, in addition to the components above.

Cu: 0.50% or Less

Copper contributes to enhancing strength through solid solution strengthening. Copper also contributes to enhancing strength by contributing to generation of the second phase. In the present invention, copper may be added as required. In order to obtain these effects, copper is contained in an amount of preferably 0.01% or more. However, when the Cu content is more than 0.50%, the effect becomes saturated, and surface defects due to copper tend to occur. For this reason, the Cu content is preferably 0.50% or less. The Cu content is more preferably 0.05% or less.

Ni: 0.50% or Less

As with the case of copper, nickel contributes to enhancing strength through solid solution strengthening. Nickel also contributes to enhancing strength by generating the second phase. In the present invention, nickel may be added as required. In order to obtain these effects, nickel is contained in an amount of preferably 0.01% or more. When added with copper, nickel acts to reduce the surface defects due to copper, and it is effective to add nickel when adding copper. The Ni content is preferably 0.50% or less because the effect becomes saturated when the Ni content is more than 0.50%. The Ni content is more preferably 0.05% or less.

B: 0.01% or Less

Boron is an element that improves quenchability, and contributes to enhancing strength by generating the second phase, and may be added as required. In order to obtain this effect, boron is contained in an amount of preferably 0.0002% or more. The B content is preferably 0.01% or less because the effect becomes saturated when boron is contained in an amount of more than 0.01%.

Ca and/or REM: 0.005% or Less in Total

Ca and REM are elements that make the sulfide spherical in shape, and contribute to reducing the adverse effect of sulfides on hole expansibility, and may be added as required. In order to obtain these effects, Ca and REM are contained in a total amount of preferably 0.0005% or more (the content of Ca or REM when only one of these elements is contained). Because the effect becomes saturated when the total content is more than 0.005%, the total content is preferably 0.005% or less.

The balance is Fe and unavoidable impurities. Examples of the unavoidable impurities include Sb, Sn, Zn, and Co. The acceptable contents of these elements are 0.01% or less for Sb, 0.10% or less for Sn, 0.10% or less for Zn, and 0.10% or less for Co. The effects according to embodiments of the present invention will not be lost even when Ta, Mg, and Zr are contained in amounts used in common steel compositions.

Micro Structure

The steel sheets according to embodiments of the present invention, including the plated steel sheet, have a micro structure that contains 70 to 90% of ferrite, 5 to 20% of martensite, 5% or less (including 0%) of retained austenite, 10% or less (including 0%) of bainite, and 5% or less (including 0%) of perlite by volume, and in which the ferrite has an average crystal grain diameter of 20 μm or less, the martensite has an average crystal grain diameter of 5 μm or less, the retained austenite has an average crystal grain diameter of 5 μm or less, and the bainite has an average crystal grain diameter of 7 μm or less. Here and below, the volume fraction is a volume fraction with respect to the total steel sheet. Property values, including the volume fraction and the average grain diameter, are values as measured by the methods described in Examples.

Ferrite: 70 to 90%

Average Crystal Grain Diameter (Average Grain Diameter) of Ferrite: 20 μm or Less The hard second phase becomes abundant when the volume fraction of ferrite is less than 70%. In this case, a large hardness difference occurs between the soft ferrite and the second phase in many parts of the micro structure, and the hole expansibility deteriorates. To avoid this, the volume fraction of ferrite is 70% or more. The volume fraction of ferrite is preferably 75% or more. The upper limit of the volume fraction of ferrite is 90% because, when the ferrite is more than 90% by volume, the hard second phase reduces, and it becomes difficult to provide tensile strength.

When the average grain diameter of ferrite is more than 20 μm, voids tend to occur at the punched edges at the time of hole expansion. In this case, desirable hole expansibility cannot be obtained, and coarse crystal grains are produced in an area from the end portions of a nugget to the heat affected zone (HAZ) after spot welding. This causes localized stress concentration at the end portions of the nugget, and the CTS decreases. To avoid this, the average grain diameter of ferrite is 20 μm or less. The lower limit of the average grain diameter of ferrite is more than 4 μm, more preferably 5 μm or more, further preferably more than 6 μm, most preferably 7 μm or more, though it is not particularly limited.

Retained Austenite: 5% or Less

Average Crystal Grain Diameter of Retained Austenite: 5 μm or Less

Desirable ductility can be provided when the micro structure contains retained austenite. However, when the volume fraction of retained austenite is more than 5%, transformation to the hard martensite occurs at the time of punching, and this creates an initiation point of voids. To avoid this, the upper limit of the volume fraction of retained austenite is 5%. In the present invention, the retained austenite may be less than 4%, or may be 3% or less. The volume fraction of retained austenite may be 0% because ductility also can be provided by other configuration. When the average crystal grain diameter of the retained austenite phase is more than 5 μm in the presence of this phase, a crack tends to propagate at the interface of the martensite that has occurred via transformation at the time of punching, and the hole expansibility deteriorates. To avoid this, the upper limit of the average crystal grain diameter of retained austenite is 5 μm. The average crystal grain diameter of retained austenite is preferably 3 μm or less. In an embodiment of the present invention, the average crystal grain diameter of retained austenite is typically 1 μm or more. In the present invention, the retained austenite may be absent, as noted above, and, in this case, the average crystal grain diameter of retained austenite is 0 μm.

Martensite: 5 to 20%

Average Crystal Grain Diameter of Martensite: 5 μm or Less

The volume fraction of martensite needs to be 5% or more to provide the desired tensile strength and yield ratio. The volume fraction of martensite is preferably 8% or more. In order to obtain desirable hole expansibility, the volume fraction of the hard martensite is 20% or less. The volume fraction of the hard martensite is preferably 18% or less, more preferably 15% or less. The volume fraction of the hard martensite is more preferably less than 15%, most preferably 14% or less. When the average crystal grain diameter of martensite is more than 5 μm, the voids generated at the interface with ferrite easily join together, and the hole expansibility deteriorates. To avoid this, the average crystal grain diameter of martensite is 5 μm or less. In an embodiment of the present invention, the average crystal grain diameter of martensite is typically 0.4 μm or more.

Bainite: 10% or Less

Average Crystal Grain Diameter of Bainite: 7 μm or Less

Desirable hole expansibility can be provided when the micro structure contains bainite. This is because bainite, which is not as soft as ferrite and not as hard as martensite, reduces void generation at the time of punching. However, when the volume fraction of bainite is more than 10%, the yield strength increases because of high dislocation density, and it becomes difficult to obtain the desired yield ratio. To avoid this, the upper limit of the volume fraction of bainite is 10%. The volume fraction of bainite may be 0% because desirable hole expansibility also can be provided by other configuration. The volume fraction of bainite may be 1% or more. When the average crystal grain diameter of bainite is more than 7 μm, coarse crystal grains are produced in an area from end portions of a nugget to HAZ after spot welding. This impairs the spot weldability, and the hole expansibility deteriorates as a result of the increased crack propagation rate in a hole expansion test. In an embodiment of the present invention, the average crystal grain diameter of bainite is typically 1 μm or more. In the present invention, bainite may be absent, as noted above, and, in this case, the average crystal grain diameter of bainite is 0 μm. Here, the volume fraction of the bainite phase means the volume proportion of bainitic ferrite (ferrite with high dislocation density) in an observed surface. The volume proportion of bainitic ferrite includes cementite, which is observed as a precipitate in the bainitic ferrite upon cooling in annealing.

Perlite: 5% or Less

Tensile strength can be provided when the micro structure contains perlite. However, when the volume fraction of perlite exceeds 5%, the yield strength increases, and it becomes difficult to obtain the desired yield ratio. To avoid this, the upper limit of the volume fraction of perlite is 5%. The volume fraction of perlite may be 0% because tensile strength also can be provided by other configuration.

Spherical cementite, and unrecrystallized ferrite may occur in the present invention, in addition to ferrite, bainite, martensite, retained austenite, and perlite. The content of spherical cementite and unrecrystallized ferrite in the structure is typically 5% or less. The present invention can achieve its objectives when it satisfies the volume fractions for ferrite, bainite, martensite, retained austenite, and perlite, and the average crystal grain diameters for ferrite, bainite, martensite, and retained austenite.

Steel Sheet

The steel sheet has the composition and the micro structure described above. The steel sheet has a thickness of typically 0.4 mm to 3.2 mm, though it is not particularly limited.

Plated Steel Sheet

The plated steel sheet according to embodiments of the present invention is a plated steel sheet having a plating layer on the steel sheet of the present invention. The plating layer is not particularly limited, and may be, for example, a hot-dip plating layer, or an electroplating layer. The plating layer may be an alloyed plating layer. The plating layer is preferably a galvanized layer. The galvanized layer may contain aluminum or magnesium. A hot-dip zinc-aluminum-magnesium alloyed plating (a Zn—Al—Mg plating layer) is also preferred. In this case, it is preferable that the Al content be 1 mass % to 22 mass %, the Mg content be 0.1 mass % to 10 mass %, and the balance be zinc. The Zn—Al—Mg plating layer may contain at least one selected from Si, Ni, Ce, and La in a total amount of 1 mass % or less, in addition to Zn, Al, and Mg. The plated metal is not particularly limited, and other metals, for example, aluminum may be used for plating, other than zinc. The plated metal is not particularly limited, and other metals, for example, aluminum may be used for plating, other than zinc.

The composition of the plating layer is not particularly limited either, and the plating layer may have a common composition. For example, in the case of a hot-dip galvanized layer or a hot-dip galvannealed layer, the composition typically contains Fe: 20 mass % or less, Al: 0.001 mass % to 1.0 mass %, one or more selected from Pb, Sb, Si, Sn, Mg, Mn, Ni, Cr, Co, Ca, Cu, Li, Ti, Be, Bi, and REM in a total amount of 0 mass % to 3.5 mass o, and the balance Zn and unavoidable impurities. In the present invention, it is preferable to provide a hot-dip galvanized layer deposited with 20 to 120 g/m$^2$ of plating each side, and a hot-dip galvannealed layer formed by alloying such a hot-dip galvanized layer. This is because a deposition amount of less than 20 g/m$^2$ makes it difficult to provide corrosion resistance. With a deposition amount of more than 120 g/m$^2$, the plating may suffer from poor resistance against detachment. As a guide, the Fe content in the plating layer is less than 7 mass % when the plating layer is a hot-dip galvanized layer, and 7 to 20 mass % when the plating layer is a hot-dip galvannealed layer.

Hot-Rolled Steel Sheet Producing Method

The method for producing a hot-rolled steel sheet is a method that includes:

hot rolling a steel material of the composition above under the conditions where the rolling reduction of the final pass of the finish rolling is 12% or more, the rolling reduction of the preceding pass of the final pass is 15% or more, and the finisher delivery temperature is 850 to 950° C.;

subjecting the steel after the hot rolling to first cooling in which the steel is cooled to a cooling stop temperature at a first average cooling rate of 50° C./s or more, the cooling stop temperature being 750° C. or less;

subjecting the steel after the first cooling to second cooling in which the steel is cooled to a coiling temperature at a second average cooling rate of 5° C./s or more and less than 50° C./s; and coiling the steel after the second cooling at a coiling temperature of 650° C. or less.

In the following descriptions, "temperature" means steel sheet surface temperature, unless otherwise specifically stated. Steel sheet surface temperature can be measured with a radiation thermometer or the like.

Preferably, the steel slab (steel material) used is produced by continuous casting to prevent macro segregation of the components. The steel material also may be produced by ingot casting, or thin slab casting.

For hot rolling, it is preferable to start hot rolling of the cast steel slab at 1,150 to 1,270° C. without reheating, or after reheating the steel material to 1,150 to 1,270° C. In a preferred hot-rolling condition, the steel slab is hot rolled at a hot-rolling start temperature of 1,150 to 1,270° C. In the present invention, the steel slab produced may be processed by the traditional method where the steel slab is cooled to room temperature, and reheated, or may be processed using a low-energy process, for example, such as direct transfer rolling/direct rolling, in which the steel slab is placed in a heating furnace while it is still warm, without cooling, or the steel slab is rolled immediately after retaining heat, or is rolled directly after being cast.

Rolling Reduction of Final Pass of Finish Rolling is 12% or More
Rolling Reduction of Preceding Pass of Final Pass is 15% or More The rolling reduction of the final pass of the finish rolling is 12% or more. This is necessary from the standpoint of introducing large numbers of shear bands in austenite grains, and increasing the nucleation site of ferrite transformation after hot rolling so that a fine hot-rolled sheet is obtained. The rolling reduction of the final pass of the finish rolling is preferably 13% or more. The upper limit is not particularly limited, and is preferably 30% or less because the hot-rolling load otherwise increases, and causes large fluctuations of sheet thickness across the sheet width, and impairs material uniformity.

The rolling reduction of the preceding pass of the final pass is 15% or more. This is necessary from the standpoint of increasing the strain accumulation effect, and introducing larger numbers of shear bands in austenite grains so that the nucleation site of ferrite transformation further increases, and the hot-rolled sheet has an even finer structure. The rolling reduction of the preceding pass of the final pass is preferably 15% or more. The upper limit is not particularly limited, and is preferably 30% or less because the hot-rolling load otherwise increases, and causes large fluctuations of sheet thickness across the sheet width, and impairs material uniformity.

Finisher delivery temperature: 850 to 950° C.

The hot rolling must end in an austenite single phase, in order to make the steel sheet structure uniform, and to reduce the anisotropy of the material, and improve the elongation and hole expansibility after annealing. To this end, the finisher delivery temperature is 850° C. or more. A finisher delivery temperature of more than 950° C. produces a coarse hot-rolled structure, and impairs the properties after annealing. The finisher delivery temperature is therefore 850 to 950° C.

Primary Cooling (First Cooling)

The primary cooling is performed under the condition that the first average cooling rate to a cooling stop temperature is 50° C./s or more, the cooling stop temperature being 750° C. or less.

The primary cooling is an important control factor in embodiments of the present invention because it controls the precipitation state of fine carbonitrides of Ti, Nb, and V while reducing segregation of manganese in the steel sheet after the hot rolling and the subsequent annealing (heating and cooling after cold rolling) described below. Controlling the state of the hot-rolled steel sheet structure makes it possible to refine the final micro structure, mainly ferrite, retained austenite, bainite, and martensite. When the first cooling rate to the cooling stop temperature is less than 50° C./s, Ti, Nb, and V form large amounts of carbonitrides in an accelerated fashion, and it becomes difficult to contribute to producing a fine steel sheet, with the result that hole expansibility and spot weldability deteriorate after annealing. The upper limit of the average cooling rate of the primary cooling is not particularly limited, and is typically 200° C./s or less. When the cooling temperature of primary cooling is more than 750° C., the cooling temperature promotes segregation of manganese, and causes excess generation of perlite in the hot-rolled sheet structure. This makes the micro structure of the hot-rolled steel sheet nonuniform, and impairs the hole expansibility after annealing. The present invention in accordance with an embodiment requires a two-stage cooling process, as will be described later. The cooling stop temperature is therefore preferably 600° C. or more. The primary cooling is performed under the cooling conditions above.

Secondary Cooling (Second Cooling)

The secondary cooling is performed after the primary cooling under the condition that the second average cooling rate to a coiling temperature is 5° C./s or more and less than 50° C./s.

When the average cooling rate to the coiling temperature is less than 5° C./s, it becomes difficult to produce a fine micro structure after annealing. When the average cooling rate is 50° C./s or more, the time to reach the perlite nose becomes shorter, and the perlite occurs in excess in the hot-rolled sheet structure, making the steel sheet structure of the hot-rolled steel sheet nonuniform, and impairing the hole expansibility and spot weldability after annealing. A cooling stop temperature (coiling temperature) of more than 650° C. promotes segregation of manganese, and impairs the properties after annealing. Because the secondary cooling needs to be performed at a slow average cooling rate as described above, it is preferable to provide a temperature difference of at least 50° C. between the cooling stop temperature of primary cooling, and the coiling temperature, which is the cooling stop temperature of secondary cooling.

Coiling Temperature: 650° C. or Less

The upper limit of coiling temperature is 650° C. because a coiling temperature of more than 650° C. promotes segregation of manganese, in addition to causing excess generation of perlite in the hot-rolled steel sheet. The preferred coiling temperature is 630° C. or less. The lower limit of coiling temperature is not particularly specified. However, the coiling temperature is 300° C. or more because an overly low coiling temperature causes excess generation of the hard martensite, and increases the load on cold rolling.

Once coiled, the steel sheet is cooled by air or by some other means, and is used to produce a cold-rolled full hard steel sheet, as described below. When the hot-rolled steel sheet is to be sold in the form of an intermediate product, the hot-rolled steel sheet is typically prepared into a commercial product after being coiled and cooled.

Cold-Rolled Full-Hard Steel Sheet Producing Method

The method for producing a cold-rolled full-hard steel sheet according to embodiments of the present invention is a method that produces a cold-rolled full-hard steel sheet by cold rolling the hot-rolled steel sheet produced by using the method described above.

The cold rolling conditions are appropriately set according to, for example, factors such as the desired thickness. In an embodiment of the present invention, the steel sheet is cold rolled at a rolling reduction of preferably 30% or more. When the rolling reduction is low, ferrite recrystallization may not be promoted, and unrecrystallized ferrite may occur in excess, and cause deterioration of ductility and hole expansibility. The rolling reduction of cold rolling is typically 95% or less.

The hot-rolled steel sheet is pickled before cold rolling to descale the sheet surface. The pickling conditions may be appropriately set.

Steel Sheet Producing Method

The steel sheet producing method includes a method that produces a steel sheet by heating and cooling the cold-rolled full-hard steel sheet (single method), and a method in which the cold-rolled full-hard steel sheet is heated and cooled to produce a heat-treated sheet, and the heat-treated sheet is heated and cooled to produce a steel sheet (double method). The single method is described first.

Maximum Achieving Temperature is 730 to 880° C.

When the maximum achieving temperature is less than 730° C., recrystallization of the ferrite phase does not proceed sufficiently, and excess unrecrystallized ferrite occurs in the micro structure, with the result that formability deteriorates. When the maximum achieving temperature is higher than 880° C., it becomes difficult to provide a fine micro structure, and the desired average crystal grain diameter cannot be obtained.

The heating conditions in the heating are not particularly limited. It is, however, preferable that the average heating rate be 2 to 50° C./s. This is because, when the average heating rate is less than 2° C./s, the austenite does not occur as a fine, uniformly dispersed phase, and it becomes difficult to provide desirable hole expansibility. When the average heating rate is higher than 50° C./s, the steel may reach a temperature where γ generation takes place, before recrystallization sufficiently proceeds. This may result in excess unrecrystallized ferrite.

Retention (Holding) Time at Maximum Achieving Temperature is 15 to 600 Seconds

When the retention time is less than 15 seconds, ferrite recrystallization does not proceed sufficiently, and excess unrecrystallized ferrite will be present in the micro structure, with the result that formability deteriorates. Formation of the second phase, which is necessary in an embodiment of the present invention, also becomes difficult. When the retention time is more than 600 seconds, the ferrite coarsens, and the hole expansibility deteriorates. For this reason, the retention time is 600 seconds or less.

Average Cooling Rate to Cooling Stop Temperature is 2 to 30° C./s Cooling Stop Temperature is 650° C. or Less The heating must be followed by cooling to the cooling stop temperature at an average cooling rate of 2 to 30° C./s. With an average cooling rate of less than 2° C./s, ferrite transformation occurs during the cooling, and the volume fraction of martensite decreases. This makes it difficult to provide strength and toughness. With an average cooling rate of more than 30° C./s, excess generation of martensite occurs, and it becomes difficult to provide ductility and hole expansibility. When the temperature region in which the cooling rate is controlled is higher than 650° C., excess generation of perlite occurs, and the predetermined volume fraction cannot be obtained for the micro structure, with the result that ductility (formability) and hole expansibility deteriorate. A cooling stop temperature of 650° C. or less is therefore necessary, as stated above. When the cooling stop temperature is less than 650° C., the cooling rate from 650° C. to the cooling stop temperature is not particularly limited. The cooling stop temperature is typically 500° C. or more.

When the dew point in a temperature region of 600° C. or more is −40° C. or less, decarburization from the steel sheet surface during annealing can be reduced, and the tensile strength of 590 MPa or more specified by the present invention can be stably achieved. The strength may fall below 590 MPa as a result of decarburization when the dew point in the foregoing temperature region is higher than −40° C. Accordingly, the dew point in the temperature region of 600° C. or more is set to −40° C. or less. The lower limit of the atmospheric dew point is not particularly limited, and is preferably −80° C. or more because the effect becomes saturated, and creates a cost disadvantage when the dew point is less than −80° C. It is to be noted here that the temperature in the foregoing temperature region is based on the surface temperature of the steel sheet. That is, the dew point is adjusted in the foregoing range when the steel sheet surface temperature is in the foregoing temperature region.

When the steel sheet is to be sold, the steel sheet is cooled to room temperature after being cooled in the foregoing cooling process, or after the temper rolling described below, before being prepared into a commercial product.

The following describes the double method. In the double method, the cold-rolled full-hard steel sheet is heated to make a heat-treated sheet. The method that produces the heat-treated sheet is the method for producing a heat-treated sheet according to embodiments of the present invention.

The heating that produces the heat-treated sheet is performed at a heating temperature of 700 to 900° C. When performed under this condition, the heating can reduce manganese segregation in the steel sheet. The heating temperature is therefore 700 to 900° C. The effect becomes insufficient when the heating temperature is less than 700° C. With a heating temperature of 900° C. or more, it becomes difficult to obtain a fine micro structure in the subsequent heating of the heat-treated sheet.

The heating is followed by cooling. The cooling conditions are not particularly limited. Typically, the cooling is performed at an average cooling rate of 1 to 30° C./s.

The heating method is not particularly limited. Preferably, the heating is performed using a continuous annealing line (CAL), or a batch annealing furnace (BAF).

In the double method, the heat-treated sheet is further heated and cooled. The heating and cooling conditions (including a dew point, a maximum achieving temperature, a retention time, an average cooling rate, and a cooling stop temperature) are the same as those described for the cold-rolled full-hard steel sheet in conjunction with the single method. As such, these will not be described again.

The steel sheet obtained by the method described above may be subjected to temper rolling, and the temper-rolled steel sheet may be regarded as the steel sheet of the present invention. The stretch rate is preferably 0.05 to 2.0%.

When the steel sheet is to be sold, the steel sheet is typically cooled to room temperature, before being prepared into a commercial product.

Plated Steel Sheet Producing Method

The method for producing a plated steel sheet according to embodiments of the present invention is a method that produces a plated steel sheet by plating the steel sheet obtained in the manner described above.

For example, the plating process may be hot-dip galvanization, or a process that involves alloying after hot-dip galvanization. Annealing and galvanization may be continuously performed in a single line. As another example, a plating layer may be formed by electroplating such as Zn-Ni alloy electroplating, or by hot-dip zinc-aluminum-magnesium alloy plating. Though the above description focuses on galvanization, the type of plated metal is not particularly limited, and the plating may be, for example, Zn plating, or Al plating. The plating process includes a process in which plating is performed after annealing, and a process in which annealing and plating are continuously performed in a plating line.

As an example, the following describes hot-dip galvanization.

The steel sheet temperature of the steel sheet dipped in a plating bath ranges preferably from (hot-dip galvanization bath temperature−40)° C. to (hot-dip galvanization bath temperature+50)° C. When the temperature of the steel sheet dipped in a plating bath is below (hot-dip galvanization bath temperature−40)° C., the molten zinc may partially solidify upon dipping the steel sheet in the plating bath, and the appearance of the plating may deteriorate. The preferred lower limit is therefore (hot-dip galvanization bath temperature−40)° C. The plating bath temperature increases when the temperature of the steel sheet dipped in a plating bath is above (hot-dip galvanization bath temperature +50)° C. This poses a problem in mass production. The preferred upper limit is therefore (hot-dip galvanization bath temperature +50)° C.

The hot-dip plating may be followed by an alloying treatment in a temperature region of 450 to 600° C. By performing an alloying treatment in a temperature region of 450 to 600° C., the Fe concentration in the plating becomes 7 to 15%, and improves the plating adhesion, and the corrosion resistance after the coating. Alloying does not proceed sufficiently when the alloying temperature is less than 450° C. This may lead to poor sacrificial anticorrosion effect, and poor slidability. When the alloying temperature is more than 600° C., alloying proceeds predominantly, and the powdering property deteriorates.

For productivity, a series of processes including the annealing (heating and cooling of the sheet sheets, including the cold-rolled full-hard steel sheet), the hot-dip plating, and the alloying treatment is preferably performed in a continuous hot-dip galvanization line (CGL). Preferably, the hot-dip galvanization uses a galvanization bath containing 0.10 to 0.20% of aluminum. The plating may be followed by wiping to adjust the deposition amount of plating.

As described above in conjunction with the plating layer, the plating is preferably Zn plating. It is possible, however, to use other metals, such as in Al plating.

EXAMPLES

Examples of the present invention are described below. However, the present invention is not to be limited by the following Examples, and may be implemented in various modifications as appropriately made within the scope conforming to the gist of the present invention, and such modifications all fall within the technical scope of the present invention.

Steels of the compositions shown in Table 1 were cast to produce slabs. The slab was hot rolled into a hot-rolled steel sheet (thickness: 3.2 mm) under the conditions where the hot-rolling heating temperature is 1,250° C., and the rolling reduction of the preceding pass of the final pass, the rolling reduction of the final pass, and the finisher delivery temperature (FDT) are as shown in Table 2. The hot-rolled steel sheet was cooled to a first cooling temperature at the first average cooling rate (cooling rate 1) shown in Table 2, and to a coiling temperature at the second average cooling temperature (cooling rate 2), and was coiled at a coiling temperature (CT). The resulting hot-rolled sheet was pickled, and cold rolled to produce a cold-rolled sheet (thickness: 1.2 mm; the cold-rolled sheet corresponds to the cold-rolled full-hard steel sheet). In a continuous hot-dip galvanization line, the cold-rolled sheet was annealed under the conditions shown in Table 2, and was subjected to hot-dip galvanization. This was followed by an alloying treatment at the temperatures shown in Table 2 to obtain hot-dip galvannealed steel sheets. As shown in Table 2, some of the steel sheets were subjected to a first heat treatment after the cold rolling. As shown in Table 2, alloying of the plating was not performed for some of the steel sheets. The plating was performed under the following conditions.

Galvanization bath temperature: 460° C.,

Al concentration in galvanization bath: 0.14 mass % (when alloying is performed), 0.18 mass % (when alloying is not performed)

Plating deposition amount: 45 g/m² (each side)

TABLE 1

| Steel type | Chemical composition (mass %) | | | | | | | | Remarks |
| --- | --- | --- | --- | --- | --- | --- | --- | --- | --- |
| | C | Si | Mn | P | S | Al | N | Other components | |
| A | 0.08 | 0.24 | 1.74 | 0.02 | 0.002 | 0.03 | 0.003 | Cr: 0.22, V: 0.05 | Compliant steel |
| B | 0.09 | 0.33 | 1.65 | 0.02 | 0.002 | 0.02 | 0.003 | Mo: 0.15, Ti: 0.03 | Compliant steel |
| C | 0.10 | 0.05 | 1.49 | 0.02 | 0.002 | 0.03 | 0.003 | Cr: 0.35, Nb: 0.02 | Compliant steel |
| D | 0.07 | 0.19 | 1.59 | 0.02 | 0.002 | 0.03 | 0.003 | Mo: 0.19, V: 0.03, Cu: 0.02 | Compliant steel |
| E | 0.08 | 0.22 | 1.55 | 0.02 | 0.001 | 0.02 | 0.002 | Cr: 0.24, Ti: 0.04, Ni: 0.03 | Compliant steel |
| F | 0.09 | 0.39 | 1.66 | 0.02 | 0.002 | 0.03 | 0.003 | Cr: 0.41, V: 0.02, B: 0.001 | Compliant steel |
| G | 0.06 | 0.34 | 1.91 | 0.02 | 0.001 | 0.03 | 0.001 | Mo: 0.14, Nb: 0.04, Ca: 0.002 | Compliant steel |
| H | 0.07 | 0.34 | 1.88 | 0.03 | 0.002 | 0.03 | 0.002 | Cr: 0.21, Nb: 0.02, REM: 0.002 | Compliant steel |
| I | 0.15 | 0.22 | 1.59 | 0.02 | 0.003 | 0.03 | 0.002 | Cr: 0.15, Ti: 0.03 | Comparative Example |
| J | 0.09 | 0.46 | 2.46 | 0.02 | 0.002 | 0.03 | 0.002 | Mo: 0.11, V: 0.04 | Comparative Example |
| K | 0.09 | 0.22 | 1.05 | 0.02 | 0.002 | 0.03 | 0.002 | Mo: 0.31, Ti: 0.02 | Comparative Example |
| L | 0.08 | 0.22 | 1.64 | 0.02 | 0.002 | 0.03 | 0.003 | Cr: 0.01, Ti: 0.08 | Comparative Example |
| M | 0.09 | 0.12 | 1.92 | 0.02 | 0.002 | 0.02 | 0.003 | Mo: 0.86, V: 0.05 | Comparative Example |
| N | 0.11 | 0.31 | 1.69 | 0.02 | 0.002 | 0.02 | 0.003 | — | Comparative Example |
| O | 0.09 | 0.44 | 1.88 | 0.02 | 0.002 | 0.02 | 0.004 | Cr: 0.15, Nb: 0.001 | Comparative Example |
| P | 0.08 | 0.21 | 1.84 | 0.03 | 0.002 | 0.02 | 0.003 | Mo: 0.22, Ti: 0.33 | Comparative Example |

TABLE 2

| Sample No. | Steel type | Hot rolling | | | | | | | First annealing Heating temp. ° C. |
| --- | --- | --- | --- | --- | --- | --- | --- | --- | --- |
| | | Preceding pass of final pass % | Final pass % | FDT ° C. | Cooling rate 1*¹ ° C./s | Cooling stop temp. ° C. | Cooling rate 2*² ° C. | CT ° C. | |
| 1 | A | 17 | 13 | 900 | 100 | 680 | 25 | 600 | — |
| 2 | B | 17 | 13 | 900 | 100 | 700 | 25 | 580 | — |
| 3 | C | 17 | 13 | 900 | 120 | 680 | 20 | 580 | — |
| 4 | D | 17 | 13 | 900 | 100 | 700 | 20 | 620 | — |
| 5 | E | 17 | 13 | 900 | 100 | 700 | 20 | 600 | — |
| 6 | F | 22 | 12 | 900 | 120 | 680 | 25 | 600 | — |
| 7 | G | 17 | 14 | 900 | 100 | 680 | 30 | 550 | — |
| 8 | H | 17 | 14 | 900 | 150 | 620 | 40 | 500 | — |
| 9 | A | 17 | 14 | 900 | 30 | 700 | 25 | 600 | — |
| 10 | A | 17 | 14 | 900 | 60 | 770 | 20 | 640 | — |
| 11 | A | 17 | 14 | 900 | 100 | 680 | 2 | 640 | — |
| 12 | B | 17 | 14 | 900 | 100 | 680 | 100 | 600 | — |
| 13 | B | 17 | 14 | 900 | 80 | 730 | 10 | 680 | — |
| 14 | C | 17 | 14 | 900 | 100 | 650 | 25 | 600 | — |
| 15 | C | 17 | 14 | 900 | 100 | 600 | 20 | 600 | — |
| 16 | C | 17 | 14 | 900 | 100 | 600 | 25 | 580 | — |
| 17 | C | 17 | 14 | 900 | 100 | 600 | 30 | 580 | — |
| 18 | I | 17 | 14 | 900 | 100 | 650 | 20 | 580 | — |
| 19 | J | 17 | 14 | 900 | 100 | 650 | 20 | 600 | — |
| 20 | K | 17 | 14 | 900 | 100 | 650 | 20 | 600 | — |
| 21 | L | 17 | 14 | 900 | 120 | 650 | 25 | 580 | — |
| 22 | M | 17 | 14 | 900 | 80 | 650 | 25 | 580 | — |
| 23 | N | 17 | 14 | 900 | 100 | 680 | 20 | 550 | — |
| 24 | O | 17 | 14 | 900 | 80 | 650 | 20 | 580 | — |
| 25 | P | 17 | 14 | 900 | 100 | 650 | 20 | 550 | — |
| 26 | A | 17 | 14 | 900 | 100 | 680 | 25 | 600 | 800 |
| 27 | B | 17 | 14 | 900 | 100 | 700 | 25 | 580 | 780 |
| 28 | C | 17 | 14 | 900 | 120 | 680 | 20 | 580 | 820 |

TABLE 2-continued

| | | | | | | | | | |
|---|---|---|---|---|---|---|---|---|---|
| 29 | A | 17 | 13 | 900 | 100 | 680 | 20 | 580 | — |
| 30 | B | 17 | 13 | 900 | 100 | 680 | 20 | 620 | — |

| | Final annealing | | | | | | |
|---|---|---|---|---|---|---|---|
| Sample No. | Dew point*³ °C. | Maximum achieving temp. °C. | Retention time second | Cooling rate 3*⁴ °C./s | Cooling stop temp. °C. | Alloying temp. °C. | Remarks |
| 1 | −50 | 810 | 300 | 5 | 525 | 525 | PE |
| 2 | −43 | 850 | 300 | 6 | 525 | 525 | PE |
| 3 | −45 | 820 | 300 | 6 | 525 | 525 | PE |
| 4 | −47 | 800 | 600 | 10 | 525 | — | PE |
| 5 | −43 | 850 | 600 | 10 | 525 | 525 | PE |
| 6 | −48 | 850 | 600 | 8 | 525 | 600 | PE |
| 7 | −50 | 820 | 600 | 5 | 525 | — | PE |
| 8 | −48 | 820 | 600 | 10 | 525 | 525 | PE |
| 9 | −48 | 830 | 600 | 10 | 525 | 525 | CE |
| 10 | −50 | 830 | 600 | 8 | 525 | 525 | CE |
| 11 | −45 | 830 | 600 | 8 | 525 | 525 | CE |
| 12 | −50 | 830 | 600 | 5 | 525 | 600 | CE |
| 13 | −47 | 800 | 300 | 8 | 525 | 525 | CE |
| 14 | −50 | 700 | 300 | 5 | 525 | 525 | CE |
| 15 | −48 | 950 | 600 | 8 | 525 | 525 | CE |
| 16 | −48 | 820 | 600 | 1 | 525 | 525 | CE |
| 17 | −48 | 850 | 600 | 8 | 700 | 525 | CE |
| 18 | −48 | 820 | 600 | 5 | 525 | 525 | CE |
| 19 | −45 | 820 | 300 | 5 | 525 | 525 | CE |
| 20 | −45 | 820 | 300 | 5 | 525 | 525 | CE |
| 21 | −45 | 830 | 600 | 5 | 525 | 525 | CE |
| 22 | −50 | 830 | 600 | 6 | 525 | 525 | CE |
| 23 | −48 | 820 | 300 | 6 | 525 | 525 | CE |
| 24 | −48 | 820 | 300 | 6 | 525 | 525 | CE |
| 25 | −45 | 830 | 600 | 6 | 525 | 525 | CE |
| 26 | −45 | 810 | 300 | 5 | 525 | 525 | PE |
| 27 | −45 | 830 | 300 | 6 | 525 | 525 | PE |
| 28 | −45 | 830 | 600 | 5 | 525 | 525 | PE |
| 29 | −48 | 820 | 600 | 15 | 525 | 525 | PE |
| 30 | −35 | 800 | 600 | 15 | 525 | 525 | CE |

*¹First average cooling rate to cooling stop temperature
*²Second average cooling rate to coiling temperature
*³Dew point in furnace in a temperature range of 600° C. or more
*⁴Average cooling rate to cooling stop temperature
PE: Example of the present invention;
CE: Comparative example A JIS 5 tensile test strip was collected from the steel sheet in such an orientation that the direction orthogonal to the rolling direction was the longitudinal direction (tensile direction) of the test strip. The test strip was then measured for tensile strength (TS), total elongation (EL), and yield strength (YS) in a tensile test (JIS Z2241 (1998)). The yield ratio (YR) was also calculated.

For hole expansibility, the steel sheet was punched to make a hole ($\phi$=10 mm) with 12.5% clearance according to the Japan Iron and Steel Federation (JFS T1001 (1996)) standards. The steel sheet was set on a tester in such an orientation that the burr was on the die side, and was measured for hole expansion rate ($\lambda$) by shaping the hole with a 60° conical punch. The steel sheet was determined as having desirable hole expansibility when it had a hole expansion rate $\lambda$ (%) of 50% or more.

For spot weldability, a pair of the hot-dip galvanized steel sheets produced in the manner described above was subjected to resistance spot welding to make a resistance spot-welded joint, using a resistance welding machine attached to a C-type gun and operated under single-phase alternate current (50 Hz) with a compression servomotor. The pair of electrode tips used is of a DR-type electrode of alumina-dispersed copper having a tip curvature radius R40, and a tip diameter of 6 mm. The welding was performed under an applied pressure of 3,500 N with 14 cycles of weld time, and 1 cycle of hold time, and the welding current was adjusted to make the nugget diameter 5.5 mm. The cross tension test (CTS) was conducted according to JIS Z3137, and the breaking strength was measured. Steel sheets with a breaking strength of 9.0 kN or more were determined as having desirable spot weldability.

The volume fractions of the ferrite, martensite, and perlite in the steel sheet were obtained in the following fashion. A cross section taken along the rolling direction of the steel sheet was polished, corroded with 3% nital, and observed at a ¼ thickness position from surface, using a SEM (scanning electron microscope) at 2,000 and 5,000 times magnifications. The area percentage was then measured according to the point counting method (ASTM E562-83 (1988)), and the measured area percentage was recorded as a volume fraction. For the calculation of the average crystal grain diameters of ferrite and martensite, the area of each phase can be calculated by incorporating pictures that have identified the ferrite and martensite crystal grains from pictures of the steel sheet structure, using the Image-Pro available from Media Cybernetics. The average crystal grain diameters of ferrite and martensite were determined by calculating the diameters of corresponding circles, and averaging the calculated values.

The volume fraction of retained austenite was determined by polishing the steel sheet over a depth of ¼ of sheet thickness from surface, and finding the X-ray diffraction intensity of the steel surface at the ¼ thickness. Specifically, the integral intensities of X-ray diffraction lines were measured for the {200} plane, {211} plane, {220} plane of ferrite, and for the {200} plane, {220} plane, {311} plane of austenite in the steel by X-ray diffractometry at an acceleration voltage of 50 keV, using the Kα line of molybdenum as a radiation source (device: RINT 2200 manufactured by Rigaku Corporation). From the measured values, the volume fraction of the retained austenite was determined using the formulae in pages 26, and 62 to 64 of the X-Ray Diffraction Handbook (2000, Rigaku Corporation). For the determination of the average crystal grain diameter of retained austenite, the surface was observed by EBSD (electron backscatter diffraction) at 5,000 times magnification, and the diameters of corresponding circles were calculated with the Image-Pro. The calculated values were then averaged to give the average crystal grain diameter of retained austenite.

The bainite was observed with a SEM (scanning electron microscope), a TEM (transmission electron microscope), and an FE-SEM (field emission scanning electron microscope), and the area percentage was measured to find the volume fraction. The average crystal grain diameter was determined by calculating the diameters of corresponding circles from a micrograph of the steel sheet structure, and by averaging the calculated values, using the Image-Pro.

The remainder structure was also confirmed. The results are presented in Table 3.

Table 3 shows the measurement results for tensile characteristics, hole expansion rate, spot weldability, and steel sheet structure. As can be seen from the results shown in Table 3, the examples according to embodiments of the present invention all had excellent elongation, excellent hole expansibility, and excellent spot weldability. The yield ratio was low, and the strength was high. On the other hand, the comparative examples were inferior in one or more of tensile strength, elongation, yield ratio, hole expansion rate, and spot weldability.

TABLE 3

| | Steel sheet structure | | | | | | | |
|---|---|---|---|---|---|---|---|---|
| | Ferrite | | Retained austenite | | Martensite | | Bainite | |
| Sample No. | Volume fraction % | Average grain diameter μm | Volume fraction % | Average grain diameter μm | Volume fraction % | Average grain diameter μm | Volume fraction % | Average grain diameter μm |
| 1 | 84 | 14 | 0 | — | 13 | 4 | 3 | 5 |
| 2 | 85 | 13 | 0 | — | 12 | 3 | 3 | 6 |
| 3 | 84 | 16 | 0 | — | 14 | 3 | 2 | 4 |
| 4 | 86 | 15 | 1 | 2 | 13 | 4 | 0 | — |
| 5 | 83 | 16 | 0 | — | 13 | 4 | 3 | 4 |
| 6 | 85 | 16 | 2 | 3 | 10 | 4 | 3 | 5 |
| 7 | 84 | 16 | 0 | — | 10 | 3 | 6 | 6 |
| 8 | 83 | 15 | 1 | 2 | 14 | 4 | 2 | 5 |
| 9 | 86 | 18 | 0 | — | 12 | 6 | 2 | 8 |
| 10 | 84 | 21 | 0 | — | 12 | 5 | 3 | 8 |
| 11 | 86 | 22 | 0 | — | 12 | 6 | 2 | 6 |
| 12 | 85 | 18 | 0 | — | 11 | 6 | 4 | 8 |
| 13 | 75 | 18 | 0 | — | 21 | 6 | 4 | 7 |
| 14 | 97 | 28 | 0 | — | 0 | — | 0 | — |
| 15 | 68 | 22 | 0 | — | 18 | 7 | 9 | 8 |
| 16 | 92 | 21 | 0 | — | 3 | 3 | 1 | 4 |
| 17 | 85 | 18 | 0 | — | 6 | 6 | 2 | 4 |
| 18 | 76 | 16 | 0 | — | 21 | 5 | 3 | 5 |
| 19 | 72 | 15 | 2 | 3 | 17 | 6 | 9 | 8 |
| 20 | 91 | 18 | 0 | — | 3 | 3 | 0 | — |
| 21 | 87 | 14 | 0 | — | 4 | 5 | 3 | — |
| 22 | 68 | 15 | 2 | 3 | 22 | 5 | 8 | 6 |
| 23 | 91 | 16 | 0 | — | 2 | 3 | 0 | — |
| 24 | 86 | 22 | 0 | — | 8 | 7 | 6 | 8 |
| 25 | 80 | 13 | 0 | — | 8 | 4 | 12 | 5 |
| 26 | 84 | 11 | 0 | — | 14 | 1 | 2 | 4 |
| 27 | 85 | 10 | 0 | — | 12 | 2 | 3 | 3 |
| 28 | 86 | 9 | 2 | 2 | 10 | 1 | 2 | 3 |
| 29 | 88 | 12 | 0 | — | 12 | 3 | 0 | — |
| 30 | 91 | 18 | 0 | — | 9 | 2 | 0 | — |

| | Steel sheet structure Remainder structure | | Tensile characteristics | | | | Hole expansion rate | Spot welding | |
|---|---|---|---|---|---|---|---|---|---|
| Sample No. | Type | Volume fraction % | TS MPa | YS MPa | YR % | EL % | λ % | CTS kN | Remarks |
| 1 | — | 0 | 613 | 388 | 63 | 31 | 59 | 9.2 | PE |
| 2 | — | 0 | 633 | 402 | 64 | 30 | 55 | 9.3 | PE |
| 3 | — | 0 | 634 | 399 | 63 | 30 | 56 | 9.2 | PE |
| 4 | — | 0 | 655 | 421 | 64 | 31 | 56 | 9.1 | PE |
| 5 | P | 1 | 609 | 391 | 64 | 33 | 53 | 9.2 | PE |
| 6 | — | 0 | 622 | 394 | 63 | 30 | 61 | 9.3 | PE |
| 7 | — | 0 | 608 | 388 | 64 | 32 | 55 | 9.3 | PE |

TABLE 3-continued

| | | | | | | | | | |
|---|---|---|---|---|---|---|---|---|---|
| 8 | — | 0 | 655 | 408 | 62 | 28 | 51 | 9.6 | PE |
| 9 | — | 0 | 643 | 411 | 64 | 29 | 37 | 8.8 | CE |
| 10 | P | 1 | 612 | 389 | 64 | 30 | 42 | 9.1 | CE |
| 11 | — | 0 | 622 | 411 | 66 | 29 | 39 | 8.2 | CE |
| 12 | — | O | 655 | 420 | 64 | 26 | 45 | 7.5 | CE |
| 13 | — | 0 | 689 | 421 | 61 | 31 | 38 | 7.3 | CE |
| 14 | SC | 3 | 458 | 331 | 72 | 42 | 45 | 6.8 | CE |
| 15 | P | 5 | 711 | 501 | 70 | 23 | 43 | 9.3 | CE |
| 16 | P | 4 | 522 | 388 | 74 | 37 | 52 | 8.2 | CE |
| 17 | P | 7 | 578 | 402 | 70 | 28 | 44 | 8.9 | CE |
| 18 | — | 0 | 712 | 455 | 64 | 24 | 32 | 8.4 | CE |
| 19 | — | 0 | 698 | 443 | 63 | 25 | 33 | 7.1 | CE |
| 20 | P | 6 | 551 | 374 | 68 | 31 | 52 | 9.2 | CE |
| 21 | P | 6 | 549 | 368 | 67 | 33 | 65 | 7.1 | CE |
| 22 | — | 0 | 733 | 488 | 67 | 25 | 43 | 8.8 | CE |
| 23 | P | 7 | 488 | 332 | 68 | 36 | 64 | 6.9 | CE |
| 24 | — | 0 | 623 | 398 | 64 | 28 | 44 | 8.5 | CE |
| 25 | — | 0 | 611 | 422 | 69 | 27 | 52 | 8.8 | CE |
| 26 | — | 0 | 622 | 398 | 64 | 39 | 68 | 9.4 | PE |
| 27 | — | 0 | 631 | 393 | 62 | 38 | 69 | 9.3 | PE |
| 28 | — | 0 | 627 | 394 | 63 | 38 | 70 | 9.1 | PE |
| 29 | — | 0 | 601 | 365 | 61 | 32 | 55 | 9.3 | PE |
| 30 | — | 0 | 582 | 355 | 61 | 31 | 51 | 9.1 | CE |

Remainder structure,
P: Perlite,
SC: Spherical cementite
PE: Example of the present invention;
CE: Comparative example

What is claimed:

1. A method for producing a hot-rolled steel sheet, the method comprising:
    hot rolling a steel material, of a composition comprising, in mass %, C: 0.05 to 0.12%, Si: 0.80% or less, Mn: 1.30 to 2.10%, P: 0.001 to 0.050%, S: 0.005% or less, Al: 0.01 to 0.10%, N: 0.010% or less, one or more selected from Cr in an amount of 0.05 to 0.50%, and Mo in an amount of 0.05 to 0.50%, one or more selected from Ti in an amount of 0.01 to 0.10%, Nb in an amount of 0.01 to 0.10%, and V in an amount of 0.01 to 0.10%, and the balance Fe and unavoidable impurities, under the conditions where a rolling reduction of a final pass of finish rolling is 12% or more, a rolling reduction of a preceding pass of the final pass is 15% or more, and a finisher delivery temperature is 850 to 950° C.;
    subjecting the steel after the hot rolling to first cooling in which the steel is cooled to a cooling stop temperature at a first average cooling rate of 50° C./s or more, the cooling stop temperature being 750° C. or less;
    subjecting the steel after the first cooling to second cooling in which the steel is cooled to a coiling temperature at a second average cooling rate of 5° C./s or more and less than 50° C./s; and
    coiling the steel after the second cooling at a coiling temperature of 650° C. or less.

2. The method of claim 1, the method comprising:
    hot rolling a steel material of the composition of claim 1, wherein the composition further comprises, in mass %, one or more selected from Cu in an amount of 0.50% or less, Ni in an amount of 0.50% or less, B in an amount of 0.01% or less, and a total of 0.005% or less of Ca and/or REM, under the conditions where a rolling reduction of a final pass of finish rolling is 12% or more, a rolling reduction of a preceding pass of the final pass is 15% or more, and a finisher delivery temperature is 850 to 950° C.;
    subjecting the steel after the hot rolling to first cooling in which the steel is cooled to a cooling stop temperature at a first average cooling rate of 50° C./s or more, the cooling stop temperature being 750° C. or less;
    subjecting the steel after the first cooling to second cooling in which the steel is cooled to a coiling temperature at a second average cooling rate of 5° C./s or more and less than 50° C./s; and
    coiling the steel after the second cooling at a coiling temperature of 650° C. or less.

3. A method for producing a cold-rolled full-hard steel sheet, the method comprising pickling and cold rolling the hot-rolled steel sheet obtained by the method of claim 1.

4. A method for producing a cold-rolled full-hard steel sheet, the method comprising pickling and cold rolling the hot-rolled steel sheet obtained by the method of claim 2.

5. A method for producing a steel sheet, comprising:
    heating the cold-rolled full-hard steel sheet obtained by the method of claim 3, the cold-rolled full-hard steel sheet being heated under the conditions where the dew point in a temperature range of 600° C. or more is −40° C. or less, and a maximum achieving temperature is 730 to 880° C.;
    retaining the heated cold-rolled full-hard steel sheet at the maximum achieving temperature for a retention time of 15 to 600 seconds; and
    cooling the retained cold-rolled full-hard steel sheet to a cooling stop temperature at an average cooling rate of 2 to 30° C./s, the cooling stop temperature being 650° C. or less.

6. A method for producing a steel sheet, comprising:
    heating the cold-rolled full-hard steel sheet obtained by the method of claim 4, the cold-rolled full-hard steel sheet being heated under the conditions where the dew point in a temperature range of 600° C. or more is −40° C. or less, and a maximum achieving temperature is 730 to 880° C.;
    retaining the heated cold-rolled full-hard steel sheet at the maximum achieving temperature for a retention time of 15 to 600 seconds; and
    cooling the retained cold-rolled full-hard steel sheet to a cooling stop temperature at an average cooling rate of 2 to 30° C./s, the cooling stop temperature being 650° C. or less.

7. A method for producing a heat-treated sheet, comprising:
  heating the cold-rolled full-hard steel sheet obtained by the method of claim 3, the cold-rolled full-hard steel sheet being heated at a heating temperature of 700 to 900° C.; and
  cooling the cold-rolled full-hard steel sheet.

8. A method for producing a heat-treated sheet, comprising:
  heating the cold-rolled full-hard steel sheet obtained by the method of claim 4, the cold-rolled full-hard steel sheet being heated at a heating temperature of 700 to 900° C.; and
  cooling the cold-rolled full-hard steel sheet.

9. A method for producing a steel sheet, comprising:
  heating the heat-treated sheet obtained by the method of claim 7, the heat-treated sheet being heated under the conditions where the dew point in a temperature range of 600° C. or more is −40° C. or less, and a maximum achieving temperature is 730 to 880° C.;
  retaining the heat-treated sheet at the maximum achieving temperature for a retention time of 15 to 600 seconds; and
  cooling the retained heat-treated sheet to a cooling stop temperature at an average cooling rate of 2 to 30° C./s, the cooling stop temperature being 650° C. or less.

10. A method for producing a steel sheet, comprising:
  heating the heat-treated sheet obtained by the method of claim 8, the heat-treated sheet being heated under the conditions where the dew point in a temperature range of 600° C. or more is −40° C. or less, and a maximum achieving temperature is 730 to 880° C.;
  retaining the heat-treated sheet at the maximum achieving temperature for a retention time of 15 to 600 seconds; and
  cooling the retained heat-treated sheet to a cooling stop temperature at an average cooling rate of 2 to 30° C./s, the cooling stop temperature being 650° C. or less.

\* \* \* \* \*